United States Patent [19]

Gatling

[11] Patent Number: 4,495,781
[45] Date of Patent: Jan. 29, 1985

[54] UNDERGROUND COOLING SYSTEM AND METHOD

[76] Inventor: Grafton G. Gatling, Rte. 1, P.O. Box 116A, Eure, N.C. 27935

[21] Appl. No.: 467,320

[22] Filed: Feb. 17, 1983

[51] Int. Cl.³ ............................................. F25D 23/00
[52] U.S. Cl. ...................................... 62/260; 165/45; 126/400
[58] Field of Search ................... 165/45, 485; 62/260; 126/400; 98/31

[56] References Cited

U.S. PATENT DOCUMENTS

| | | | |
|---|---|---|---|
| 231,058 | 8/1880 | Way | 62/260 |
| 2,178,176 | 10/1939 | Lamm | 62/260 |
| 3,049,067 | 8/1962 | Claude | 98/31 |
| 3,236,294 | 2/1966 | Thomason | 165/485 |
| 4,008,709 | 2/1977 | Jardine | 126/400 |
| 4,205,718 | 6/1980 | Balch | 126/400 |
| 4,258,780 | 3/1981 | Suo | 62/260 X |
| 4,291,751 | 9/1981 | Wolf | 62/260 X |

Primary Examiner—Henry Bennett
Attorney, Agent, or Firm—Robert L. Spicer, Jr.

[57] ABSTRACT

An underground air cooling system and method for at least one building including an air line disposed beneath the ground for conveying air to an I-tank filled with fluid that is also disposed beneath the ground. The fluid in the lower compartment of the I-tank absorbs heat from the air in the air line and dissipates that heat quickly to the surrounding earth and to the fluid in the upper compartment of the I-tank. In addition, a fluid line is connected to the I-tank and is interposed in the path of the air in the air line. Cold water from the I-tank runs through the water line. As air passes over the fluid line in the air line, the air is further cooled and dehumidified before being conveyed to a building to be cooled. In a preferred embodiment, a second water line is connected to the lower compartment of the I-tank and is disposed in different parts of a building so that cool water from the I-tank runs through coils of the second water line in different portions of the building. A fan can be provided to blow air over the coils of the second fluid line thereby further cooling the air in the building.

32 Claims, 6 Drawing Figures

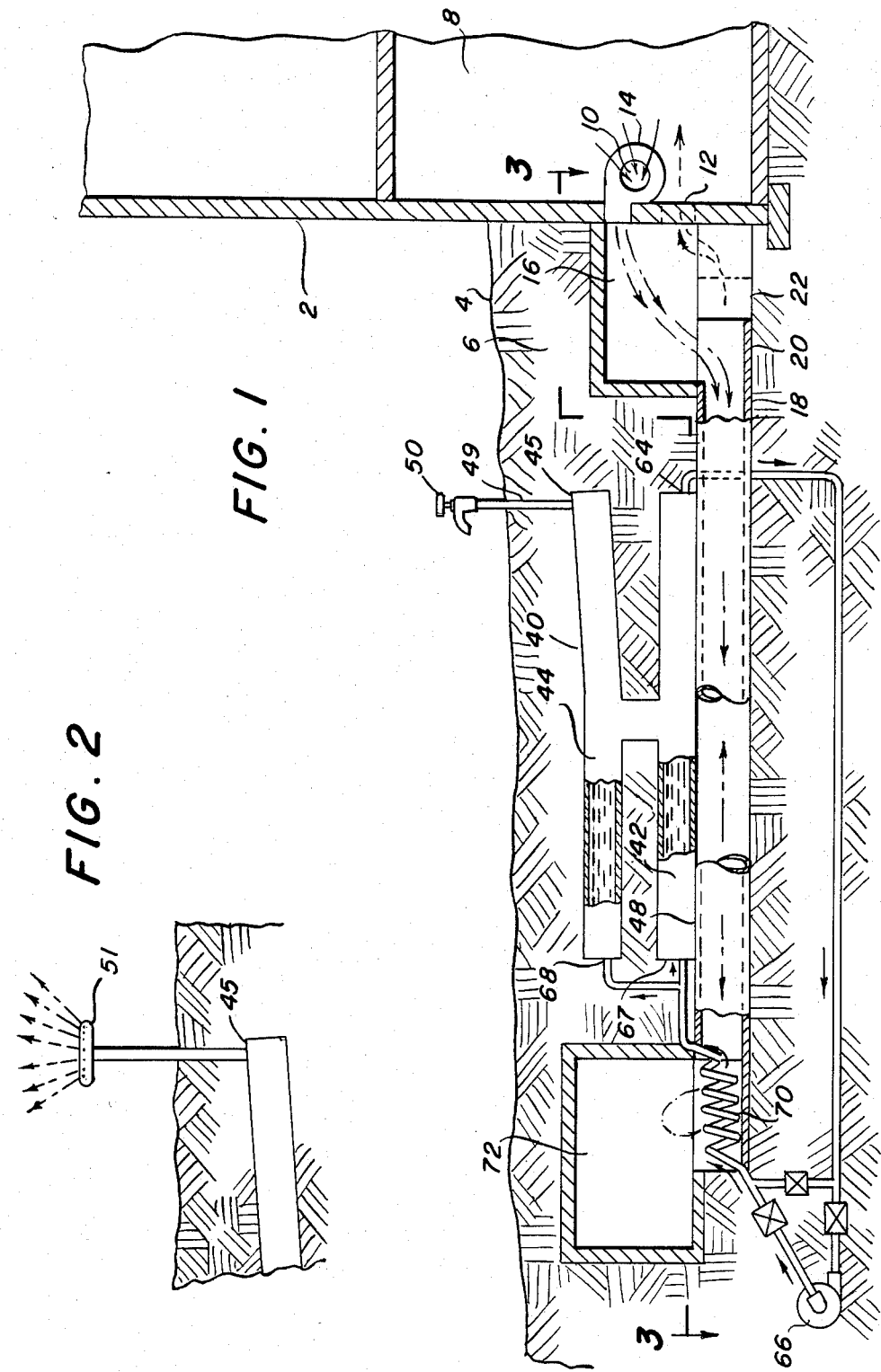

UNDERGROUND COOLING SYSTEM AND METHOD

FIELD OF THE INVENTION

This invention relates to a cooling system for a building using an underground heat exchanger.

BACKGROUND OF THE INVENTION

Conventional air conditioning systems use freon, a compressor and a fan which are powered by electricity. The cost of the freon and the compressor has always been high. In addition, the amount of electricity needed to power the compressor has always been substantial. In the past decade, however, the cost of electricity and the materials used to manufacture conventional air conditioning systems have increased dramatically.

One way in which to lower the costs of cooling a building is to replace the expensive compressor and freon with a less expensive cooling medium. One such cooling medium is the ground beneath the earth. At a depth of six feet, in the temperate zone, the earth has a relatively constant temperature of approximately 57° F.

Many cooling systems have been manufactured which use the ground beneath the earth as a cooling medium to cool a building. However, these cooling systems are still relatively expensive and not very efficient. For example, the patent to ROGERS et al., U.S. Pat. No. 4,234,037, discloses a set of pipes which carry air from a building to a location beneath the ground and then return the air to the building. However, the transfer of heat through the pipes to the ground is not very efficient. ROGERS et al., in fact, states that in many applications his cooling system can only act as a supplement to and not replace a conventional cooling system.

The patent to TROYER, U.S. Pat. No. 4,323,113, forces air into a heat exchanger 14 buried beneath the ground, which contains heat transfer material 52 such as crushed brick, stones, or a plurality of vessels containing water. The air passes over and between material 52 to become cooled. The TROYER patent, while more efficient than ROGERS et al. is still relatively inefficient and is also expensive. The housing for heat exchanger 14 must be made of concrete to hold the heat transfer material 52. Furthermore, once the material 52 is heated by contact with the warm air, this heat is not dissipated very quickly and therefore the device only has a limited capacity for cooling. In addition, these rocks in heat exchanger 14, or even the vessels containing water in heat exchanger 14 are not mobile and therefore cannot be moved to other locations to cool additional air.

The patent to SUO, U.S. Pat. No. 4,258,780, is directed to a cooling device that must be used with a heat pump and a heat exchanger 19 in a building 20. Fluid from the heat pump travels beneath the ground to exchange heat with a second fluid in pipes 4. Fluid such as freon in pipes 4 has a low boiling point, so that it becomes vaporized upon contact with the first fluid, thereby absorbing the heat from the first fluid. When the second fluid vaporizes, it travels up pipe 4, dissipating its heat, condensing and returning to the bottom of pipe 4. Although SUO shows a somewhat efficient means of dissipating the heat in the fluid beneath the ground, SUO is relatively expensive, because it requires the use of a heat pump and a heat exchanger in the dwelling and the use of expensive freon. In addition, SUO uses needless electricity to run the heat pump and heat exchanger.

Thus, there is a need for a low-cost cooling unit consuming a small amount of energy, which efficiently dissipates the heat of the building beneath the surface of the earth.

SUMMARY OF THE INVENTION

It is therefore an object of the present invention to provide a low-cost cooling unit consuming a small amount of energy and which efficiently dissipates the heat of a building beneath the surface of the earth.

These and other objects, features and advantages of the present invention are attained by an underground cooling system using cool air for cooling at least one building. The cooling system comprises an air conveying means for conveying air underground and a container means for containing a liquid. The air conveying means includes an inlet for receiving air, a blower for blowing air into the inlet, an outlet for emitting cooled air into a building, an air line for transmitting air therethrough, connecting the inlet to the outlet. The container means includes an upper compartment, and a lower compartment spaced apart from the upper compartment at a different vertical height and in communication therewith so that if a liquid is in the container, it may flow between the upper and lower compartments. The container means is disposed at a depth beneath the ground such that when liquid is in the lower compartment, the liquid is at a lower temperature than air in the air conveying means. The air conveying means conveys air to a location where the air will become cooled by an exchange of heat with liquid from the lower compartment.

The air line may either contact the lower compartment or be spaced a distance from the lower compartment such that a substantial exchange of heat occurs between fluid in the lower compartment and the air in the air line.

The cooling system may also include a first fluid conveying means, attached at one end to the lower compartment and attached at its other end to the container means, for conveying liquid from the lower compartment therethrough. A section of the first liquid conveying means is interposed in the path of air in the air line.

In another embodiment, the air line may have first and second sections and may further include a junction chamber connecting the first and second sections. The junction chamber has a greater cross-sectional area than the air line and at least a portion of the first liquid conveying means is interposed in the junction chamber. The cooling system may also include a circulator for circulating liquid in the first liquid conveying means.

In another embodiment, the air conveying system further includes first and second chambers connecting the air line to the inlet and the outlet respectively. These first and second chambers have a greater cross-sectional area than the inlet, outlet, and the air line.

The first liquid conveying means and the container means may comprise a liquid cooling system which may further include a second liquid conveying means, attached at one end to the lower compartment and attached at its other end to the liquid cooling system for conveying liquid from the lower compartment. A section of the second liquid conveying means may be disposed in a part of the building different from the outlet or in a second building, different from the building containing the outlet.

In another embodiment, the invention comprises an air conveying means for conveying air underground, a container means for containing a liquid and a first fluid conveying means for conveying fluid from the container. The container means contains an upper compartment and a lower compartment spaced from the upper compartment at a different vertical height and in communication therewith, so that a liquid, if in such container, may flow therebetween. The container means is disposed at a depth beneath the ground such that when liquid is in the lower compartment, the liquid is at a lower temperature than the air in the air conveying means. The air conveying means conveys air to a location where the air will become cooled by an exchange of heat with liquid from the lower compartment. The first liquid conveying means is attached at one end to the lower compartment and attached at its other end to the container means. A portion of the first liquid conveying means is disposed in the air conveying means. The container means may be in the shape of an I that is filled with liquid and the upper compartment may have one end which is higher than the rest of the upper compartment.

Another embodiment of the present invention comprises an air conveying means for conveying air underground and a container means for containing a liquid. The container means includes a lower portion disposed at a depth beneath the ground such that when liquid is in the lower portion, the liquid is at a lower temperature than air in the air conveying means. The air conveying means conveys air to a location where the air will become cooled by an exchange of heat with liquid from the lower portion of the container means, thereby producing cooled air. The air conveying means then conveys the cooled air from the location of heat exchange to the building to be cooled. The container means may be connected to a source of liquid under pressure, and entire container means may be disposed beneath the ground.

The container means may have an upper and lower compartment at different vertical heights in communication with one another so that if a liquid is in the tank, the liquid may flow therebetween. In addition, the container means may be in the shape of an I and one end of the higher compartment may be higher than the rest of the upper compartment. The cooling system may also include a removal means disposed above the ground and attached to the higher end of the upper compartment for removing liquid and air from the upper compartment.

The cooling system may also include a first liquid conveying means attached at one end to the lower portion of the container means and attached at its other end to the container means, for conveying fluid from the lower portion of the container means. A section of the first liquid conveying means is interposed in the path of the air in the air conveying means and this section may be in the shape of a coil. A circulation pump may also be included for pumping liquid through the first liquid conveying means and the container means. In addition, a plurality of container means, may be provided, all of which exchange heat with the air conveying means.

The air conveying means may include an inlet, for receiving air from the building, a blower or fan for blowing air into the inlet, an outlet for emitting cooled air into the building, and an air line connecting the inlet to the outlet. A portion of the air line is disposed at a location where the air in the air line will exchange heat with liquid in the lower portion of the container means.

The air line may comprise a first section connected to the inlet and a second section connected to the outlet. A junction chamber may also be provided for connecting the first and second sections, and having a cross-sectional area sufficiently greater than the cross-sectional area of the first and second sections so that a venturi effect is produced as the air travels from the first section to the junction chamber and as air travels from the junction chamber to the second section.

The air conveying means may further include first and second chambers. The first chamber is connected between the inlet and the air line and the second chamber is connected between the outlet and the air line. The cross-sectional area of the first and second chambers is larger than the cross-sectional areas of the inlet, outlet and air line so as to produce a venturi effect as the air travels from the inlet to the first chamber, from the first chamber to the air line, from the air line to the second chamber, and from the second chamber to the outlet.

This embodiment may also include a first liquid conveying means attached at one end to the bottom of the lower portion of the container means and attached at its other end to the container means for conveying liquid from the lower portion of the container means. A section of the fluid conveying means is interposed in the air line.

The junction chamber may include a partition wherein the first section of the air line is connected to the junction box on one side of the partition and the second section is connected to the junction box on the other side of the partition. The partition may contain an opening therein in which a portion of the first fluid conveying means is disposed.

The container means and the first fluid conveying means may comprise a liquid cooling system which further includes a second liquid conveying means attached at one end to the lower portion of the container means and attached at its other end to the liquid cooling system, for conveying fluid from the lower portion of the container means. A part of the second liquid conveying means is located in a part of the building different from that part of the building which receives cooled air from the air conveying means or may be located in a second building. Also included is a circulator for circulating liquid in the first and second liquid conveying means.

The entire length of the lower portion of the container means may contact the air line at the location where the air exchanges heat with the container means, or the entire length of the lower portion of the container means may be sufficiently close to the first section of the air line such that substantial heat exchange occurs between air in the air line and liquid in the lower portion of the container means.

The invention also includes a method of cooling air in one portion of at least one building. The method includes conducting air into an air line beneath the ground, and transferring heat from air in the air line to liquid in the lower portion of a container filled with liquid to produce cool air and heated water. Next, heat from the liquid in the lower portion of the tank is transferred to the ground and to liquid in the upper portion of the container, which is spaced from the lower portion at a different vertical height, so that the lower portion of the container remains substantially colder than air in the air line. Finally, the cooled air is conducted in the air line to the building.

The method may also include transferring heat from the air in the air line to a first liquid line by direct contact of the air with the first liquid line. The first liquid line is cooler than the air in the air line. The first liquid line may also communicate with the container and the method may further include circulating the liquid from the lower portion of the container to the first liquid line. Any air that is trapped in the container may be removed by opening a valve connected to the highest part of the upper portion of the container. In addition, liquid may be removed from the upper portion of the container and discharged onto the ground.

In addition, liquid may be conducted from the lower portion of the container into a second fluid line, a portion of which is located in the building receiving cooled air, or in a second building. Air is blown over a portion of the second liquid line, thereby cooling the air and providing additional cooling to the building.

BRIEF DESCRIPTION OF THE DRAWINGS

The foregoing and other objects, features and advantages of the present invention will become more apparent to those of ordinary skill in the art to which the invention pertains in light of the following detailed description of the preferred embodiment as discussed and illustrated in the accompanying drawings, in which like reference characters designate like or corresponding parts throughout the several embodiments, and wherein:

FIG. 1 is a side view, partially in section, of the cooling system of the present invention.

FIG. 2 is a side view of an alternative embodiment of the present invention, showing a portion of the upper compartment of the tank and a sprinkler attached thereto.

FIG. 5 illustrates a schematic top view of the cooling system and a building cooled by the cooling system in a test of the cooling system.

DETAILED DESCRIPTION OF THE PREFERRED EMBODIMENTS

Figure 3:
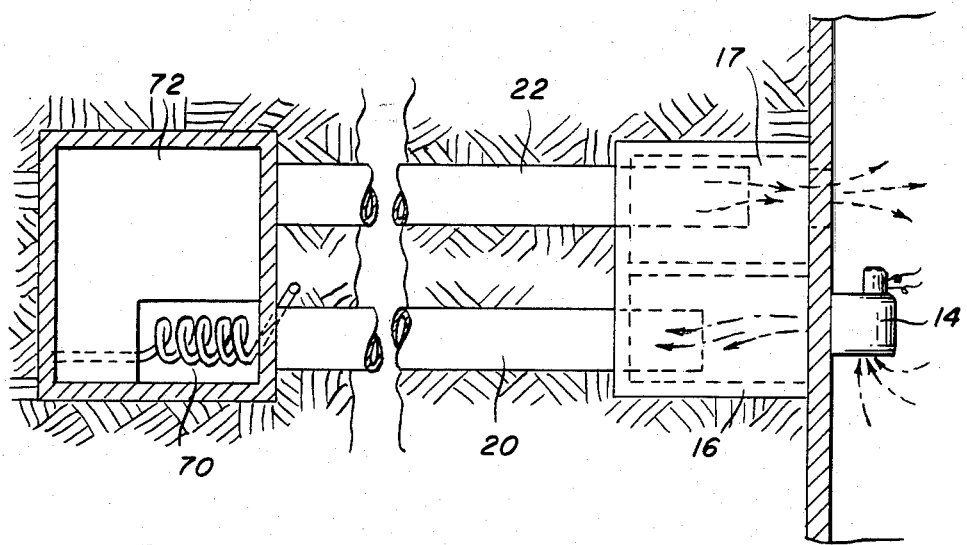
FIG. 3 illustrates a top view taken along line 3—3 in FIG. 1 of the cooling system of the present invention wherein the fluid line is interposed in the first section of the air line.

It is well known that at a depth of approximately six feet in the temperature zones of the earth, that the temperature of the earth is a relatively constant 57° F. This fact is used to great advantage in designing the cooling system of the present invention which is inexpensive to manufacture and which can cool one or several large buildings while consuming little power. The cooling system of the present invention comprises a container such as an I-tank 40 that is filled with a liquid or fluid, such as water, and which is disposed at least six feet beneath the ground as seen in FIG. 1. Because of the depth at which the I-tank is located beneath the ground, the water in the I-tank will maintain a constant temperature of approximately 57° F. Thus, the fluid in the I-tank may be used as a heat sink or heat exchanger for absorbing heat from air taken from a building to be cooled or from above the surface of the ground. Because container 40 has lower and upper compartments 42 and 44 which are spaced apart at different vertical heights, and which communicate with one another, liquid in lower compartments 42 that is heated by absorbing heat from the air will quickly dissipate that heat into the ground and into upper compartment 44.

The air is conveyed from the building by an air conveying means or system. The system may comprise an ar line 18 and a fan blower 14. Air line 18 is adjacent to the lower portion of I-tank 40 so that air at the air passing through air line 18 gives up its heat to the colder water in the bottom of the I-tank through the walls of air line 18 and the bottom of the I-tank. In addition, a first liquid or fluid conveyor in the form of a fluid line 62 is provided to further cool the air in air line 18. A portion of first fluid line 62, in the shape of a coil 70, receives cold water from lower compartment 42 of the I-tank. Coil 70 is interposed in the path of the air in the air line 18 to further cool the air. The cooled air is then returned to the building.

The cooling system of the present invention has a number of advantages. First, because the source of the cooling is cold water which is maintained in its cooled condition by the earth, no expensive fluids such as freon are needed. Second, because the system does not rely for its cooling effect on the expansion and contraction of fluids with low boiling points, there is no need for a compressor which further reduces the cost of operating the present cooling system. All that is needed is a small fan to force the air through the air line. Third, because an I-tank is used when the water in lower compartment 42 becomes heated, it travels to upper compartment 44 away from the source of the heat, (which is the air in air line 18) so that the heat of the heated water may be quickly dissipated to the surrounding earth, thereby increasing the cooling capacity of the system. Fourth, because water or some other similar fluid is used to cool the air, this cool fluid may itself be pumped into one or more surrounding buildings in a second fluid line and therefore be the basis of an additional cooling system, needing only a fan to blow air over the cool water or fluid in the second fluid line.

FIG. 1 illustrates one preferred embodiment of the present invention. A building 2 is shown extending below the surface 4 of ground 6. Room 8 in building 2 contains an inlet 10 and an outlet 12 for the cooling system. Inlet 10 and outlet 12 form one part of the air conveying means or system, which also includes chamber 16 and 18, air line 18, junction chamber 72 and fan 14.

Inlet 10 has connected thereto a fan or blower 14 for blowing air from room 8 into the rest of air conveying system as is shown by the arrows near fan 14 and throughout the air conveying system. The fan may be a relatively small fan having, for example a two amp motor.

Fan 14 forces air from room 8 into a first chamber 16. Chamber 16 communicates with a first section 20 of an air line 18.

In order to reduce the static resistance of the air against the walls of the air conveying system and to cool the air slightly, the cross-sectional area of the chamber 16 is chosen so as to much larger than the cross-sectional area of inlet 10 and air line 18 so as to produce a venturi effect as the air travels from inlet 10 to chamber 16 and chamber 16 to air line 18.

Thus, the air travels from room 8, through chamber 16 into first section 20 of air line 18. Air line 18 is preferably disposed at least six feet beneath surface 4 of ground 6. At this depth the earth has a temperature of approximately 57° F. Thus, the walls of air line 18 contact the surrounding earth which is at approximately 57° F. Therefore, as the air passes through air line 18 it is cooled by the cooled walls of air line 18 which are in contact with the cooled surrounding earth. The process by which this takes place is conduction through the walls of air line 18.

Two additional means may be used to cool the air in air line 18. First, a container or I-tank 40 is placed in contact with the walls of the first section 20 of air line 18. I-tank 40 is filled with a fluid such as water. I-tank 40 is preferably connected to a source of fluid under pressure, such as a water main (not shown). The I-tank contains a lower compartment 42, an upper compartment 44 and a vertical section 46. Upper compartment 44 communicates with lower compartment 42 via vertical section 46. The bottom 48 of lower compartment 42 is preferably placed in contact with the outer wall of first section 20 of air line 18. Because the water in lower compartment 42 is also deep beneath the ground, its temperature is also approximately 57° F. As air flows through first section 20, it also gives up some of its heat, through the walls of first section 20 and the bottom 48 of I-tank 40 to the fluid in the lower section 42 of I-tank 40. Thus, in this second way the air in air line 18 is cooled. Alternatively, bottom 48 of I-tank 40 may be spaced a short distance from the first section 20, as long as it is sufficiently close to first section 20 so that substantial heat exchange takes place between fluid in I-tank 40 and the air in first section 20.

As the water in lower section 42 becomes heated, it dissipates some of its heat through the walls of lower section 42 into the surrounding earth. Because upper section 44 is spaced from lower section 42 the earth between the two sections acts as an additional heat sink to absorb some of the heat from the heated water in section 42. However, all of the heat is not dissipated to the surrounding earth. Thus, the water still has a higher temperature than the surrounding earth. According to well known hydraulic and thermodynamic principals, the heated water travels upward from lower compartment 42, through vertical section 46 to upper compartment or section 44. Simultaneously with this movement, cool water in upper compartment 44 flows downward into compartment 42 thereby replacing the hot water with cool water in compartment 42, thereby maintaining the low temperature of the water in compartment 42. The heated water in upper compartment 44 dissipates its heat through the walls of compartment 44 into the surrounding earth. In this way the water or fluid in lower compartment 42 remains cooler than the air in air line 18 and cooler than the water in the upper compartment 44, as it continuously absorbs heat from the air in air line 18. The depth at which lower compartment 42 is buried is such that the water in lower compartment 42 remains at a substantially lower temperature than the air in air line 18. Furthermore, it is not necessary for upper compartment 44 to be disposed beneath the ground. Only lower compartment 42 need be disposed below the surface of the earth.

It is apparent that the other shapes for container 40 could be used such as a Z. A rectangular tank could also be used and the cooling system would function to cool a building, but it is preferable for the container to have two compartments, spaced apart at different vertical heights and in communication with one another. In this way the surface area of the container that is in contact with the earth is increased and the liquid in the lower compartment has the opportunity to flow vertically upward, away from the source of heat.

In order for the I-tank 40 to efficiently absorb and dissipate heat, tank 40 must be completely filled with fluid. Any air that remains in tank 40 acts as an insulator to prevent the absorption and dissipation of heat. However, even when it appears that the tank is completely filled with fluid, tiny air bubbles may remain. To facilitate the removing of these air bubbles from tank 40, one end 45 of upper compartment 44 is bent slightly upward so that end 45 occupies the highest vertical point of the tank. Any air bubbles present in the tank will rise to the highest point in the tank which is end 45. A means for removing this unwanted air comprises a spigot or valve 50 connected via line 49 to end 45 of upper compartment 44. When spigot 50 is opened any air remaining in the tank will be bled off through line 49 and spigot 50. In addition, should the user require warm water, this warm water may be obtained by opening spigot 50. Furthermore, if the surface 4 of ground 6 does not contain grass, warm water from tank 40 may be discharged through spigot 50 onto the surface of ground 4. As the water evaporates it will further cool the ground, thereby lowering the temperature of the ground, the fluid in tank 40 and the air in the air line 18. Alternatively, a sprinkler 51 can be used, as seen in FIG. 2, instead of a spigot 50.

The use of I-tank 40 allows the cooling system of the present invention to cool a large building in 90° F. weather. When needed, however, the cooling capacity of the present invention can be increased by using another means of cooling.

This additional means for cooling the air in air line 18 is a first liquid or fluid conveyor comprising a first fluid line, a portion of which is interposed in the path of the air in fluid line 18. First fluid line 62 is connected at one end 64 to lower compartment 42 of I-tank 40. Thus, cold water travels through water line 62. The water travels through a circulation pump 66 wich pumps the cool water from end 64 to a series of coils 70 which are interposed in the path of air in first section 20. From coil 70, fluid line 62 is connected at 67 to lower compartment 52 and at 68 to upper compartment 44. As the air travels over coils 70 which are filled with cold water, the air is further cooled. The shape of a coil is preferably used because a coil has a greater surface area per unit length in the line than a straight piece of the fluid line, and therefore more cooling of the air will occur. In addition to cooling the air, coils 70 act as a dehumidifier to condense water vapor out of the air in line 18. A water trap or other means for absorbing the water in line 18 (not shown) may be provided. Furthermore, a standard dehumidifier may also be added to the system if coils 70 are not used to reduce the humidity of the air.

After passing over coils 70, the air in section 20 travels into a junction chamber 72. Like chamber 16, chamber 72 has a larger cross-sectional area than either first section 20 or second section 22 of air line 18, thereby reducing the static resistance and producing a venturi effect which further cools the air as it travels from section 20 to chamber 72 and from chamber 27 to section 22.

Figure 3A:
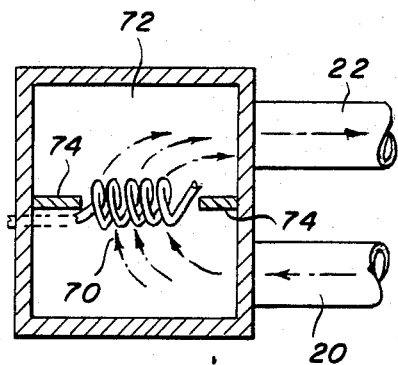
FIG. 3a is an alternative embodiment, and is a top view of a portion of the cooling system, wherein the cooling coils of the fluid line are disposed in a junction chamber connecting first section and second section of the air line.

In an alternative embodiment shown in FIG. 3a, junction chamber 72 may contain a partition 74 containing an opening therein in which coils 70 are disposed. First section 20 is connected to junction chamber 72 on one side of partition 74 and second section 22 is connected to chamber 72 on the other side of partition 74. In this embodiment, sand (not shown) may be placed at the bottom of chamber 72 for absorbing water that condenses from the air as it passes over coils 70.

From second section 22, the air travels into another chamber 17 which is disposed between second section 22 and outlet 12. Chamber 17 also has a larger cross-sectional area than outlet 12 and second section 22 so that a venturi effect is produced as the air enters and leaves chamber 17 thereby reducing static resistance and slightly cooling the air.

In order to exchange heat as efficiently as possible, air line 18 is composed of black paper-thin plastic. Typically, sections 20 and 22 are 60 feet long, chambers 16, 17 and 72 are four inches square, the I-tank is 40 feet long and composed of pvc pipe.

Figure 4:
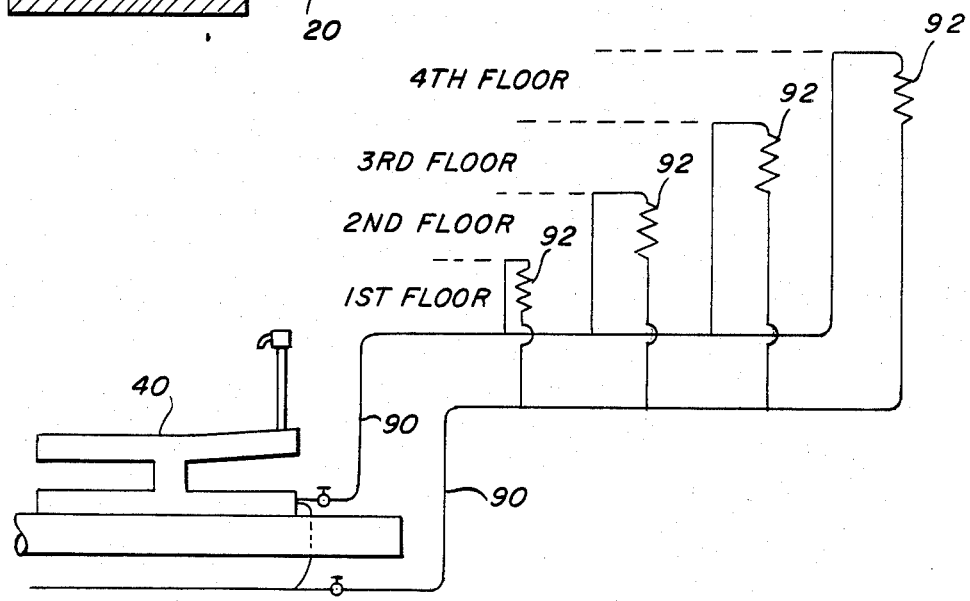
FIG. 4 is a schematic side view of an other embodiment of the present invention wherein a second fluid line is connected to the lower portion of the tank and travels to various floors of a building.

The cooling capacity of the present invention may be further increased in several ways. First, several I-tanks may be placed side by side and used to cool a plurality of air lines or one air line. Second, additional fluid or liquid conveyors or lines may be connected to lower compartment 42 of I-tank 40 and disposed in different parts of a building that receives cooled air from outlet 12, or to another building entirely. FIG. 4 shows such an embodiment. In FIG. 4, a second fluid or liquid line 90 is attached to one end to lower compartment 42. Line 90 is connected at its other end to any point in a liquid cooling system comprising first fluid line 62 and tank 40. Various branches of line 90 are disposed on the first, second, third and fourth floors of either the same building that receives cooled air from outlet 12 or a different building. A fan or blower (not shown) may be provided to blow air over coils 92 of fluid line 90. Because coils 92 contain cold water from lower compartment 42 of I-tank 40 the air that is blown over coils 92 will be cooled. Instead of a fan, coils 92 could be run through an already existing air conditioner to supplement the cooling power of the air conditioner. Note that the use of either liquid or fluid line 62 and 90 is optional; however, when they are used they require the use of circulator pump 66.

An experiment was conducted using the cooling system of the present invention to cool a building 40 feet by 75 feet. The cooling system used first and second sections of the air line which were approximately 60 feet long and an I-tank which was approximately 40 feet long. The blower used was model UENB 1000, one-fourth horse power, 240209, serial number RF01782385 of Ruud Air Conditioning Division, Rheem Manufacturing Co. The blower was 2.0 amps, 220 volts, 1725 rpm and 1000 cfm. Air temperatures at various points in the building and outside the building were monitored using a calibrated digital pyrometer, type IDT, No. FC323A, serial number F62786, manufactured by Service Tectonics Instrument Company. FIG. 6 shows a schematic diagram of the building, the cooling system and various locations at which the temperatures were measured. The results are tabulated in the table below as follows:

| Time | Test Location No. and Temperature °F. | | | | | | Comments |
|---|---|---|---|---|---|---|---|
| | 1 | 2 | 3 | 4 | 5 | 6 | |
| 11:20 | 72° F. | 72° F. | 71° F. | 63° F. | 59° F. | 82° F. | Weather: Sunny and clear. Front double doors were open immediately prior to tests. |
| 11:30 | 65° F. | 65° F. | 65° F. | 62° F. | 59° F. | 82° F. | Sunny and clear |
| 11:45 | 62° F. | 62° F. | 62° F. | 61° F. | 59° F. | 82° F. | Sunny and clear |
| 12:00 | 64° F. | 64° F. | 64° F. | 62° F. | 59° F. | 82° F. | Sunny and clear |
| 12:15 | 64° F. | 64° F. | 64° F. | 62° F. | 59° F. | 82° F. | Sunny w/occasional clouds |
| 12:30 | 65° F. | 65° F. | 65° F. | 62° F. | 60° F. | 81° F. | Sunny w/occasional clouds |
| 12:45 | 64° F. | 64° F. | 64° F. | 61° F. | 60° F. | 82° F. | Sunny and clear |
| 1:00 | 64° F. | 63° F. | 64° F. | 61° F. | 60° F. | 82° F. | Sunny and clear |
| 1:15 | 64° F. | 64° F. | 64° F. | 61° F. | 60° F. | 82° F. | Sunny and clear |
| 1:30 | 64° F. | 64° F. | 64° F. | 61° F. | 60° F. | 82° F. | Sunny and clear Turned cooling system off. |
| 2:00 | 68° F. | 68° F. | 68° F. | 66° F. | 65° F. | 82° F. | 30 minutes after system was turned off. |

As can be seen from the above table, when the temperature on the outside of the building was 82° F. the temperature at various points on the inside of the building was no higher than 65° F., and this result was achieved by using only a one-fourth horsepower blower. The fluid lines and circulator were not used.

The present invention, may be carried out in other specific ways than those herein set forth without departing from the spirit and essential characteristics of the invention. The present embodiments are, therefore, to be considered in all respects as illustrative and not restrictive and various modifications and changes may be made without departing from the scope of the present invention.

What is claimed is:

1. An underground cooling system using cooled air for cooling at least one building comprising:
 (a) an air conveying means for conveying air underground including:
  (i) an inlet for receiving air;
  (ii) a blower for blowing air into said inlet;
  (iii) an outlet for emitting cooled air into said building;
  (iv) an air line for transmitting air there-through, connecting said inlet to said outlet; and
 (b) a container means for containing a liquid, including:
  (i) an upper compartment;
  (ii) a lower compartment, spaced apart from said upper compartment, at a different vertical height and in communication therewith so that when a liquid is in said container means said liquid may flow therebetween, wherein said container means is disposed at a depth beneath the ground such that when liquid is in said lower compartment, said liquid is at a lower temperature than air in said air conveying means, wherein said air conveying means conveys air to a location where the air will become cooled by an exchange of heat with liquid from said lower compartment, a first liquid conveying means, attached at one end to said lower compartment and connected at its other end to said container means, for conveying liquid from said lower compartment therethrough, wherein a section of said first liquid conveying means is interposed in the path of air in said air line, said air line has first and second sections and said air conveying means further includes a junction chamber connecting said first and second sections wherein said junction chamber has a greater cross-sectional area than said air line and wherein at least a portion of said first liquid conveying means is interposed in said junction chamber.

2. An underground cooling system using cooled air for cooling at least one building comprising:
  (a) an air conveying means for conveying air underground including:
    (i) an inlet for receiving air;
    (ii) a blower for blowing air into said inlet;
    (iii) an outlet for emitting cooled air into said building;
    (iv) an air line for transmitting air therethrough, connecting said inlet to said outlet; and
  (b) a container means for containing a liquid, including:
    (i) an upper compartment;
    (ii) a lower compartment, spaced apart from said upper compartment, at a different vertical height and in communication therewith so that when a liquid is in said container means said liquid may flow therebetween, wherein said container means is disposed at a depth beneath the ground such that when liquid is in said lower compartment, said liquid is at a lower temperature than air in said air conveying means, wherein said air conveying means conveys air to a location where the air will become cooled by an exchange of heat with liquid from said lower compartment, a first liquid conveying means, attached at one end to said lower compartment and connected at its other end to said container means, for conveying liquid from said lower compartment therethrough, wherein a section of said first liquid conveying means is interposed in the path of air in said air line, first and second chambers connecting said air line to said inlet and outlet, respectively, wherein said first and second chambers have a greater cross-sectional area than said inlet, outlet and said air line.

3. An underground cooling system using air for cooling at least one building comprising:
  (a) an air conveying means for conveying air underground;
  (b) a container means for containing a liquid, having a lower portion disposed at a depth beneath the ground such that when liquid is in said lower portion, said liquid is at a lower temperature than air in said air conveying means, wherein said air conveying means conveys air to a location where the air will become cooled by an exchange of heat with liquid from the lower portion of said container means, thereby producing cooled air and said said conveying means conveys the cooled air from said location to the building, said air conveying means comprises:
    (a) an inlet for receiving air from said building;
    (b) an outlet for emitting said cooled air into said building;
    (c) an air line connecting said inlet to said outlet and a portion of which is disposed at said location where air in said air line will exchange heat with liquid in said lower portion of said container means, said air line comprises a first section connected to said inlet and second section connected to said outlet, and a junction chamber connecting said first and second sections, wherein the cross-sectional area of said junction chamber is sufficiently greater than the cross-sectional area of said first and second sections so that a venturi effect is produced as the air travels from said first section to the junction chamber, and as the air travels from the junction chamber to the second section.

4. An underground cooling system using air for cooling at least one building comprising:
  (a) an air conveying means for conveying air underground;
  (b) a container means for containing a liquid, having a lower portion disposed at a depth beneath the ground such that when liquid is in said lower portion, said liquid is at a lower temperature than air in said air conveying means, wherein said air conveying means conveys air to a location where the air will become cooled by an exchange of heat with liquid from the lower portion of said container means, thereby producing cooled air and said conveying means conveys the cooled air from said location to the building, said air conveying means comprises:
    (a) an inlet for receiving air from said building;
    (b) an outlet for emitting said cooled air into said building;
    (c) an air line connecting said inlet to said outlet and a portion of which is disposed at said location where air in said air line will exchange heat with liquid in said lower portion of said container means, said air conveying means further includes first and second chambers, said first chamber being connected between said inlet and said air line, said second chamber being connected between said outlet and said air line, wherein the cross-sectional area of the first and second chambers is larger than the cross-sectional areas of said inlet, outlet and air line so as to produce a venturi effect as said air travels from said inlet to said first chamber, from said first chamber to said air line, from said air line to said second chamber and from said second chamber to said outlet.

5. The underground cooling systwem of claim 1 wherein said container means is filled with liquid.

6. The underground cooling system of claim 1 wherein said container means is in the shape of an I.

7. The underground cooling system of claim 1 wherein said air line contacts said lower compartment.

8. The underground cooling system of claim 1 wherein said air line is spaced at a distance from said lower compartment such that substantial exchange of heat occurs between fluid in said lower compartment and air in said air line.

9. The underground cooling system of claim 1 or 2, further including a circulator for circulating liquid in said first liquid conveying means.

10. The underground cooling system of claim 1 or 2, wherein said first liquid conveying means and said container means comprise a liquid cooling system, and further including a second liquid conveying means, attached at one end to said lower compartment and attached at its other end to said liquid cooling system, for conveying liquid from said lower compartment, wherein a section of said second liquid conveying means is disposed in a part of a building different from said outlet.

11. The underground cooling system of claim 1 or 2, wherein said first liquid conveying means and said container means comprise a liquid cooling system, and further including a second liquid conveying means, attached at one end to said lower compartment and attached at its other end to said liquid cooling system, for conveying liquid from said lower compartment, wherein a section of said second liquid conveying means is disposed in a second building different from said building having said outlet.

12. The underground cooling system of claim 2 wherein said container means is filled with liquid.

13. The underground cooling system of claim 2 wherein said container means is in the shape of an I.

14. The underground cooling system of claim 2 further including a circulator for circulating liquid in said container means and said first liquid conveying means.

15. The underground cooling system of claim 2 wherein said air conveying means is a distance from said lower compartment such that substantial heat exchange occurs between fluid in said lower compartment and air in said air conveying means.

16. The underground cooling system of claim 2 wherein one end of said upper compartment is higher than the rest of said upper compartment.

17. The cooling system of claim 1 or 2 wherein said container means is connected to a source of liquid under pressure.

18. The cooling system of claim 1 or 2 wherein said entire container means is disposed beneath the ground.

19. The cooling system of claim 3 or 4, wherein said container means comprises a tank having an upper and lower compartment at different vertical heights in communication with one another so that if a liquid is in said tank said liquid may flow therebetween, wherein said lower portion is the lower portion of the lower compartment.

20. The cooling system of claim 3 or 4 wherein said tank is in the shape of an I.

21. The cooling system of claim 3 or 4 wherein one end of said upper compartment is higher than the rest of said compartment.

22. The cooling system of claim 21 further including a removal means above the ground and attached to the higher end of the upper compartment for removing liquid and air from said upper compartment.

23. The cooler of claim 3 or 4 wherein the section of the liquid conveying means which is in the path of air in said air conveying means is in the shape of a coil.

24. The cooling system of claim 3 or 4 further including a circulation pump for pumping liquid through said liquid conveying means and said container means.

25. The cooling system of claim 3 or 4 further comprising a plurality of container means, all of which exchange heat with air in said air conveying means.

26. The cooling system of claim 4 wherein said air line comprises a first section connected to said inlet and second section connected to said outlet, and a junction chamber connecting said first and second sections, wherein the cross-sectional area of said junction chamber is greater than the cross-sectional area of said first and second sections so that a venturi effect is produced as the air travels from said first section to the junction chamber, and as the air travels from the junction chamber to the second section.

27. The cooling system of claim 3 or 4, further including a first liquid conveying means attached at one end to the bottom of said lower portion of said container means and attached at its other end to said container means for conveying liquid from said container means, wherein a section of said liquid conveying means is interposed in said air line.

28. The cooling system of claim 26 wherein said junction chamber includes a partition wherein said first section is connected to said junction box on one side of said partition and said second section is connected to said junction box on the other side of said partition, wherein said partition contains an opening therein in which said portion of the first liquid conveying means is disposed, said first liquid conveying means being attached to one end to the bottom of said lower portion of said container means, and attached at its other end to said container means, and for conveying liquid from said container means.

29. The cooling system of claim 3 or 4 further including a fan at said inlet for forcing air from said building into said inlet.

30. The cooling system of claim 3 or 4 wherein a part of said building receives cooled air from said air conveying means, and wherein said container means and said liquid conveying means comprise a liquid cooling system, wherein said cooling system further includes:
(a) a second liquid conveying means attached at one end to said lower portion of said container means and attached at its other end to said liquid cooling system for conveying fluid from said lower portion of said container means, wherein a portion of said second liquid conveying means is located in a part of said building different from the part of said building which receives cooled air from said air conveying means; and
(b) a circulator for circulating liquid in said liquid conveying means and said container means.

31. The cooling system of claim 3 or 4 wherein the entire length of the lower portion of said container means contacts said air line at the location where the air will exchange heat with said container means.

32. The cooling system of claim 3 wherein said entire length of said lower portion of said container means is sufficiently close to said first section of said air line so that substantial heat exchange occurs between said air in said first section and liquid in said lower portion of said container means.

* * * * *